(12) United States Patent
Menke

(10) Patent No.: US 10,124,960 B2
(45) Date of Patent: Nov. 13, 2018

(54) CHAIN CONVEYOR WITH ADJUSTABLE DISTANCE BETWEEN SHAFTS

(71) Applicant: REXNORD FLATTOP EUROPE B.V., 's-Gravenzande (NL)

(72) Inventor: Cornelis Hendrik Mijndert Menke, 's-Gravenzande (NL)

(73) Assignee: REXNORD FLATTOP EUROPE B.V., 's-Gravenzande (NL)

( * ) Notice: Subject to any disclaimer, the term of this patent is extended or adjusted under 35 U.S.C. 154(b) by 0 days.

(21) Appl. No.: 15/548,851

(22) PCT Filed: Feb. 4, 2016

(86) PCT No.: PCT/NL2016/050078
§ 371 (c)(1),
(2) Date: Aug. 4, 2017

(87) PCT Pub. No.: WO2016/140564
PCT Pub. Date: Sep. 9, 2016

(65) Prior Publication Data
US 2018/0244474 A1    Aug. 30, 2018

(30) Foreign Application Priority Data
Feb. 5, 2015   (NL) ...................... 2014241

(51) Int. Cl.
*B65G 23/06* (2006.01)
*B65G 21/22* (2006.01)
(Continued)

(52) U.S. Cl.
CPC ............ *B65G 23/06* (2013.01); *B65G 17/08* (2013.01); *B65G 17/40* (2013.01); *B65G 21/22* (2013.01);
(Continued)

(58) Field of Classification Search
CPC .... B65G 17/08; B65G 17/083; B65G 17/086; B65G 17/40; B65G 21/22; B65G 23/04;
(Continued)

(56) References Cited

U.S. PATENT DOCUMENTS 2,303,984 A * 12/1942 Byers ...................... B07B 13/04
                                                         198/851
2,804,190 A * 8/1957 Jorgenson ................. A21B 3/18
                                                         198/463.4
(Continued)

FOREIGN PATENT DOCUMENTS

WO         93/20294 A1   10/1993

OTHER PUBLICATIONS

International Search Report and Written Opinion dated Jun. 29, 2016 in connection with PCT/NL2016/050078.
(Continued)

*Primary Examiner* — Gene O Crawford
*Assistant Examiner* — Keith R Campbell
(74) *Attorney, Agent, or Firm* — Quarles & Brady LLP

(57) ABSTRACT

A modular conveyor (1) comprising a conveyor mat or chain (2) constructed of a series of links (3) hingedly connected together into an endless loop arranged to be circulated around two spaced diverting wheel units (4, 5). Each link is positioned at a pitch distance from an adjacent link, which pitch distance is at least substantially the same throughout the conveyor mar or chain. At least one of the diverting wheel units (5) comprises a drive shaft (9), a drive wheel (10) mounted on the drive shaft and drivingly engaging the conveyor mat or chain and further an upper idler wheel (12) mounted on an idler wheel shaft. The upper idler wheel shaft is positioned above the drive wheel shaft, such that intermediate distance between said upper idler wheel shaft and
(Continued)

drive shaft equals a distance of (n times the pitch distance+ substantially a ½ time the pitch distance).

14 Claims, 3 Drawing Sheets

(51) Int. Cl.
*B65G 23/44* (2006.01)
*B65G 17/08* (2006.01)
*B65G 17/40* (2006.01)

(52) U.S. Cl.
CPC .......... *B65G 23/44* (2013.01); *B65G 2207/30* (2013.01); *B65G 2812/02089* (2013.01)

(58) Field of Classification Search
CPC ........ B65G 23/06; B65G 23/10; B65G 23/12; B65G 23/44; B65G 39/12; B65G 2207/30; B65G 2812/02089
USPC ........ 198/834, 835, 842, 843, 850, 851, 853
See application file for complete search history.

(56) References Cited

U.S. PATENT DOCUMENTS

| | | | | |
|---|---|---|---|---|
| 3,722,661 A * | 3/1973 | Williams | ............... | B65G 37/00 198/692 |
| 3,759,369 A * | 9/1973 | Vering | ................. | B65G 17/007 110/329 |
| 3,866,770 A * | 2/1975 | Palmer | ..................... | B60P 1/38 198/550.13 |
| 4,026,410 A * | 5/1977 | Korting | .................. | F27B 21/06 198/851 |
| 4,177,635 A * | 12/1979 | Klimezky | ............ | B65G 17/385 198/852 |
| 4,780,040 A * | 10/1988 | Petersen | ................ | B65G 23/44 198/817 |
| 4,884,393 A * | 12/1989 | Hilleby | ................ | A01D 45/006 56/327.1 |
| 6,325,205 B1 * | 12/2001 | Heyde | ..................... | A23G 3/22 198/835 |
| 7,040,480 B2 * | 5/2006 | Sedlacek | ............... | B65G 15/60 198/457.02 |
| 7,850,562 B2 * | 12/2010 | DeGroot | ................ | B65G 15/26 474/153 |
| 8,985,423 B2 * | 3/2015 | Ehrmann | ................. | B65B 9/04 226/172 |

OTHER PUBLICATIONS

IWIS: "Chain engineering Design and construction Examples of calculation", IWIS Website, Nov. 30, 2006 (Nov. 30, 2006), pp. 1-86; XP055282134, Munchen, Retrieved frm the Internet: URL:http://www.iwis.de/uploads/tx_sbdownloader/KettenHanbuch_E.pdf [retrieved on Jun. 20, 2016].

\* cited by examiner

CHAIN CONVEYOR WITH ADJUSTABLE DISTANCE BETWEEN SHAFTS

CROSS-REFERENCE TO RELATED APPLICATIONS

This application represents the national stage entry of PCT International Application No. PCT/NL2016/050078 filed on Feb. 4, 2016, which claims the benefit of Netherlands Patent Application No. 2014241 filed on Feb. 5, 2015, the entire contents of which is incorporated herein by reference for all purposes.

The invention relates to a modular conveyor, in particular comprising a modular plastic conveyor mat or chain.

Modular conveyor mats or chains are generally constructed of series of mat modules or chain links connected together by hinge pins at hinge joints into endless loops. Such a mat or chain is arranged to be circulated around two spaced diverting wheel units. Usually at least one of the diverting wheel units comprises a drive wheel which is rotated by a motor. Generally, control surfaces, such as teeth, on the periphery of the drive wheel can positively engage corresponding surfaces on the mats or chain. Because the hingedly joined chain links or mat links are substantially rigid, a chain or mat forms a polygon about the drive wheel. Thus, the radius of the mat or chain varies periodically around the drive wheel. As the motor rotates the drive wheel at a constant angular speed, the varying radius causes the linear speed of the mat or chain to fluctuate and the mat or chain links to rise and fall with respect to their line of engagement with the drive wheel. This "chordal action" or "polygon effect," causes a periodic vibrating motion and linear mat or chain speed variation, which can jostle conveyed articles in a product conveyor, annoy passengers on a moving walkway, or even induce resonance and high amplitude oscillations. Furthermore, the lever arm of a force that is exerted on the chain train thus changes with the angle of rotation of the chain wheel, whereby the load moment and the advance speed of the chain that results in the direction of the chain tension vary periodically. Apart from the load and speed variations, variations of the chain or mat at the running height are also produced, which combined might result in undesired vibrations in the modular conveyor, and thus in increased wear and tear of a drive of the conveyor. When designing the drive intended to be used for a drive wheel, especially a chain wheel, this "polygon effect" must therefore generally be taken into account.

To counterbalance the polygon effect, a large number of technical solutions have to date been proposed in the prior art. A compensation for the polygon effect may, for instance, be achieved by using comparatively large drive wheels comprising a large number of teeth or sprockets. Though machines having large sprocket wheels run comparatively steadily, this would, however, result in an increase of the construction space required for the drive, and an increase of the number of mat or chain links or increased costs, to ensure that also the weight of the mat or chain, and thus the drive performance to be installed, are increased. Besides, relatively large wheels located near the end or start of an upper run can be highly unwanted, because at such places, at which transported goods or products are for instance to be transferred to or from a conveying surface of the conveyor, e.g. at right-angled or in-line transitions between said conveyor and a second conveyor, relatively large slide-over plates may be needed when relatively large drive wheels and/or relatively large idler wheels are used, thereby resulting in highly unwanted dead spaces lacking a moving top surface.

Further, it is known from the prior art, to provide for a special mat or chain guide mechanism as a means to compensate the polygon effect, which guide mechanism guides the mat or chain to the drive wheel in a manner to ensure that the effect of the rigid chain links has only a reduced influence.

For instance, in chain pulling devices intended to be used for pulling solid, pipe, round, and profiled stock, hereinafter referred to as material to be pulled, using a rotating chain, the polygon effect might have considerable influence on the quality of the material to be pulled as variations in speed and vibrations directly affect the homogeneity of the pulling process, the quality of the surface of the material to be pulled, and the length tolerances of the pulled material. In a continuous pulling process, the material to be pulled is gripped with gripping tools and is pulled by the rotating driving chain pairs. Such type of continuous pulling device is, for instance, known from European Pat. No. EP 0 860 216 A1, in which further a drive intended to be used for the continuous pulling device is known, in which the polygon effect has already been taken into account by providing a gear transmission in the drive chain between the driving motor and the driven chain wheels. The drive shaft of the gear transmission is connected to the motor shaft of the driving motor via a piston crosshead joint, and is installed in a position that is swung around an angle. Owing to the piston crosshead joint, an irregularity of the circumferential speed is achieved if the drive shaft and the driven shaft are horizontally swung relative to each other, which irregularity is to be used for compensating the polygon effect. The compensating effect of such drive decisively depends on the adjustment of the angle between the drive shaft and the driven shaft. Such type of drive therefore requires, on the one hand, accurate adjustment of the angle, and, on the other hand, regular monitoring of the setting, as, if the angle is unfavourably and incorrectly adjusted, an increase of the polygon effect, rather than a compensation for it, would be achieved. The thus required construction space additionally increases costs. For practical use to achieve steady movement of a chain, in particular in a pulling device, the drive known from EP 0 860 216 A1 is therefore less suitable, in particular when used in modular conveyors for carrying and transporting items.

Thus, there is a need for a modular conveyor in which products transported by the mat or chain thereof advance linearly at a substantially constant speed, even with small-diameter drive wheels.

It is an object of the invention to provide a modular conveyor, especially with a plastic conveyor mat or chain, in which modular conveyor the polygon effect is reduced by using simple means so that the modular conveyor can be used to advance conveyed products linearly at a substantially constant speed, even with small-diameter drive wheels. In accordance with the invention this object is obtained by a modular conveyor, comprising:

a conveyor mat or conveyor chain for conveying products in a transport direction, said mat or chain including a series of modules successive in the transport direction, hingedly connected together into an endless loop, wherein said modules, viewed in the transport direction, are each provided at their front and rear side with hinge loops, wherein the hinge loops of modules successive in the transport direction cooperate and are coupled with the aid of hinge pins extending transversely to the transport direction, the hinge loop at the front side of a module being positioned at a pitch distance from the hinge loop at the front side of an adjacent module, the pitch distance at which each hinge loop at the front side of a module is positioned from a hinge loop at the front side of an adjacent module being at least substantially the same throughout the conveyor mat or chain, said conveyor further comprising:

two spaced apart diverting wheel units around which the conveyor mat or chain is to be circulated, the modular mat or chain comprising an upper run with an outer surface forming a transport surface for carrying items in the transport direction and a lower return run, at least one of the diverting wheel units comprising a drive shaft, a drive wheel mounted on the drive shaft and drivingly engaging the conveyor mat or chain, said conveyor mat or chain being diverted around the drive wheel, and a motor coupled to the drive shaft for during operation rotating the drive shaft and the drive wheel, wherein the at least one diverting wheel unit further comprises an upper idler wheel mounted on an idler wheel shaft, wherein the radius of the upper idler wheel and the radius of the drive wheel are substantially equal to each other, said upper idler wheel being positioned at a height level located above the drive wheel for diverting the conveyor mat or chain from the upper run in an at least partly downward direction towards the drive wheel, and wherein a centre line of said upper idler wheel shaft is positioned at an intermediate distance from a centre line of the drive shaft, which intermediate distance equals a distance of (n times the pitch distance+substantially a ½ time the pitch distance), in which n is a natural number.

In this manner during operation a fluctuation in the linear speed of the top run of the conveyor mat or chain is at least partly counteracted due to the chordal action generated by the upper idler wheel which compensates at least partly for a fluctuation in the linear speed of the conveyor mat or chain due to the chordal action generated by the drive wheel. In particular—during operation—the fluctuation in the linear speed of the conveyor mat or chain due to the chordal action generated by the upper idler wheel is at least partly out of phase with the fluctuation in the linear speed of the conveyor mat or chain due to the chordal action generated by the drive wheel.

In an embodiment of a modular conveyor according to the invention the upper idler wheel and the drive wheel are mounted displaceable relative to each other for adjusting the intermediate distance between the centre line of said upper idler wheel shaft and the centre line of the drive shaft. In this manner it is possible to adjust the intermediate distance to take account of play within the conveyor mat or chain and possible elongation of the conveyor mat or chain during its operating life while still being able to reduce the polygon effect. Account of elongation of the pitch distance may be taken by adjusting said intermediate distance to facilitate that the intermediate distance is a distance of (n times the pitch distance+substantially a ½ time the pitch distance), in which n is a natural number.

In an advantageous embodiment of a modular conveyor according to the invention, the upper idler wheel and the drive wheel are provided on their periphery with control surfaces, such as teeth, wherein the number of control surfaces on the upper idler wheel and the number of control surfaces on the drive wheel are equal to each other.

However, in alternative embodiments, the upper idler wheel and/or the lower positioned drive wheel may be free of control surfaces, such as teeth. Since the hingedly joined modules are rigid, a chain or mat will also form a polygon about the drive wheel and/or about the upper idler wheel when the respective wheel/wheels is/are free of teeth or other control surfaces. It is noted that a reduction of the polygon effect can thus also be achieved when the upper wheel and/or the drive wheel are/is not provided on their periphery with control surfaces, such as teeth.

In a further embodiment of a modular conveyor according to the invention, the modular conveyor comprises a guide surface, such as a guide roller or guide bar, positioned below the return run and supporting the return run, said guide surface being positioned such relative to the drive wheel that the series of mat or chain links are in contact with the drive wheel at least over 120° of the drive wheel. In this manner the drive wheel is able to transfer sufficient drive force to the conveyor mat or chain so that it can be circulated correctly around the diverting wheel units.

In a still further embodiment of a modular conveyor according to the invention the modular conveyor comprises a tensioning means being arranged for contacting the outer surface of the conveyor mat or chain, said tensioning means being adjustable for keeping the tension within the conveyor mat or chain at least substantially constant. Preferably, the tensioning means can comprise the drive wheel which is arranged to be at least vertically displaceable and/or the tensioning means can comprise the guide surface which is arranged to be displaceable, preferably at least vertically displaceable and/or at least horizontally or vertically displaceable. In this manner the tensioning means can be used and when necessary adjusted to keep the tension within the conveyor mat or chain at least substantially constant which makes it possible to be able to reduce the polygon effect during the operating life of the conveyor mat or chain.

The invention will be further explained with reference to the drawing, in which non-limiting exemplary embodiments of modular conveyors in accordance with the invention are shown. In the drawing.

Figure 1:
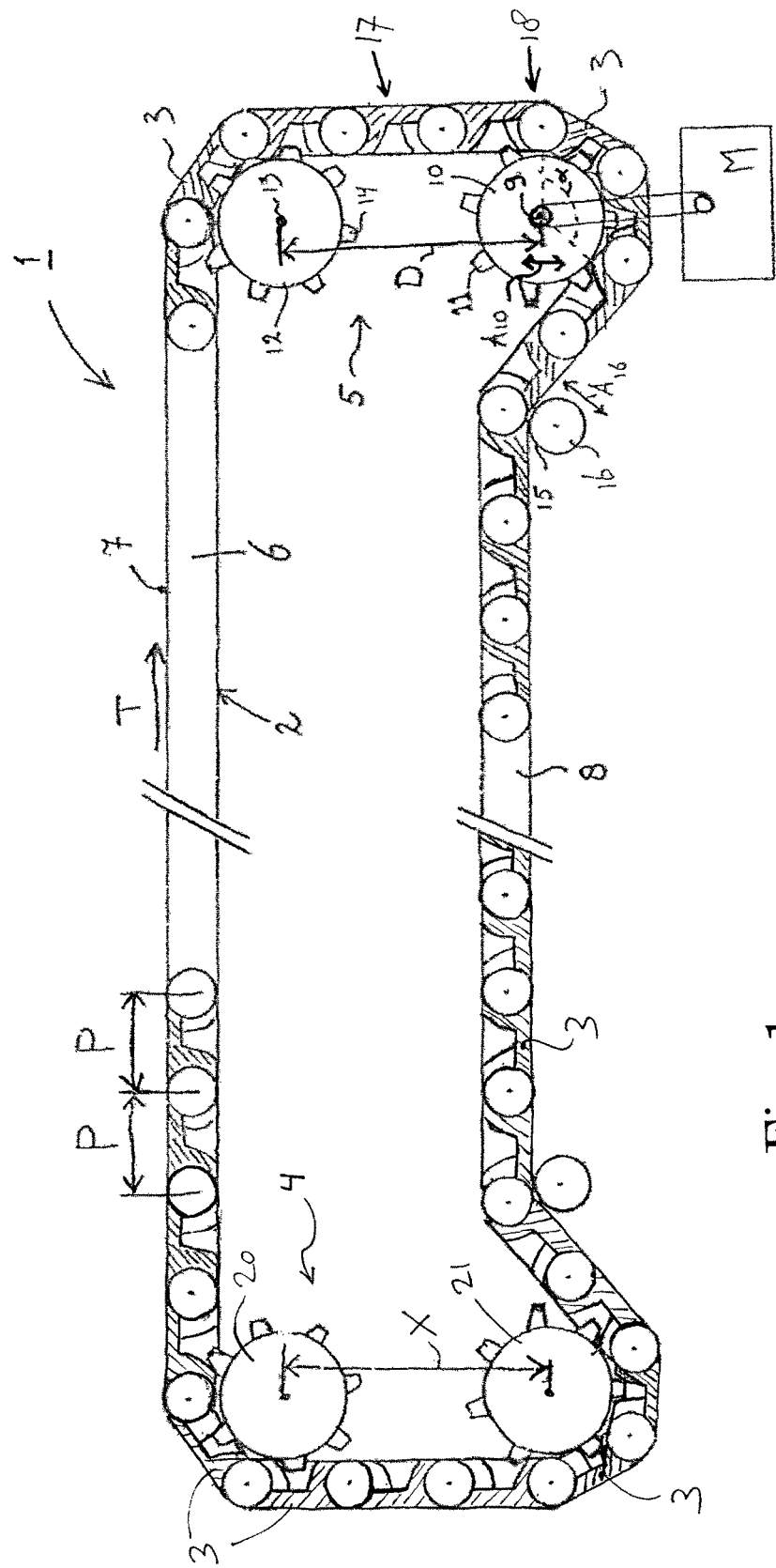
FIG. 1 shows a schematic view in cross section of a first embodiment of a modular conveyor comprising a conveyor mat or chain constructed of a series of mat or chain links hingedly connected together into an endless loop according to the invention.

In the figures, schematic views in cross section of embodiments of a modular conveyor 1 according to the invention are shown. Said modular conveyor 1 comprises a conveyor mat or conveyor chain 2, in particular a substantially plastic conveyor mat or chain, for conveying products in a transport direction T. Said mat 2 or chain 2 includes a series of modules 3 or links 3, in particular substantially plastic modules 3, successive in the transport direction T. Said modules 3 are hingedly connected together into an endless loop, in a manner known per se. Said modules 3, viewed in the transport direction T, are each provided at their front and rear side with hinge loops, wherein the hinge loops of modules 3 successive in the transport direction T cooperate and are coupled with the aid of hinge pins extending transversely to the transport direction T. The hinge loop at the front side of a module being positioned at a pitch distance P from the hinge loop at the front side of an adjacent module 3. It is noted that the pitch distance P at which each hinge loop at the front side of a module 3 is positioned from a hinge loop at the front side of an adjacent module 3 is at least substantially the same throughout the conveyor mat or chain 2. The modular conveyor 1 further comprises two spaced apart diverting wheel units 4, 5 around which the conveyor mat or chain 2 is to be circulated. The endless loop is thus arranged to be circulated around the first diverting wheel unit 4 and the second diverting wheel unit 5 which are spaced from each other, for instance in a direction substantially parallel to the transport direction T. The endless loop comprises an upper run 6 with an outer surface 7 for carrying items or products in the transport direction T and a lower return run 8.

The second diverting wheel unit 5 comprises a drive shaft 9, a drive wheel 10 mounted on the drive shaft 9 and a motor M coupled to the drive shaft 9 for during operation rotating the drive shaft 9 and the drive wheel 10. During operation, the drive wheel 10 drivingly engages the conveyor mat or chain 2, which is diverted around the drive wheel 10. As can be seen in the shown embodiments, the drive wheel 10 may in embodiments be provided on its periphery with teeth 11 as control surfaces that positively engage corresponding surfaces on the links 3 of the conveyor mat or chain 2.

The second diverting wheel unit 5 further comprises an upper idler wheel 12 mounted on an idler wheel shaft 13. The upper idler wheel 12 is positioned at a height level above the height level of the drive wheel 10 and diverts the conveyor mat or chain 2 from the upper run 6 in a downward direction towards the drive wheel 10. For example, the centre line of the drive wheel shaft 9 may be located substantially straight below the centre line of the upper idler wheel 12 or the upper idler wheel shaft 13, i.e. said centre lines can be offset from each other substantially in a vertical direction, as can be seen in the embodiments shown in FIGS. 1 and 2. However, in alternative embodiments, such as for instance in the embodiment shown in FIG. 3, the centre line of the idler wheel 12 may be located higher than the centre line of the drive wheel 10, but not substantially straight above it, for instance in order to save space. In such embodiments, seen in the transport direction T, the drive wheel 10 can preferably be positioned at least partly behind the idler wheel 12, for instance in order to counteract that said drive wheel 10 will get in the way of a second conveyor onto which goods transported by the modular conveyor 1 can be transferred at the end of the upper run 6.

Figure 2:
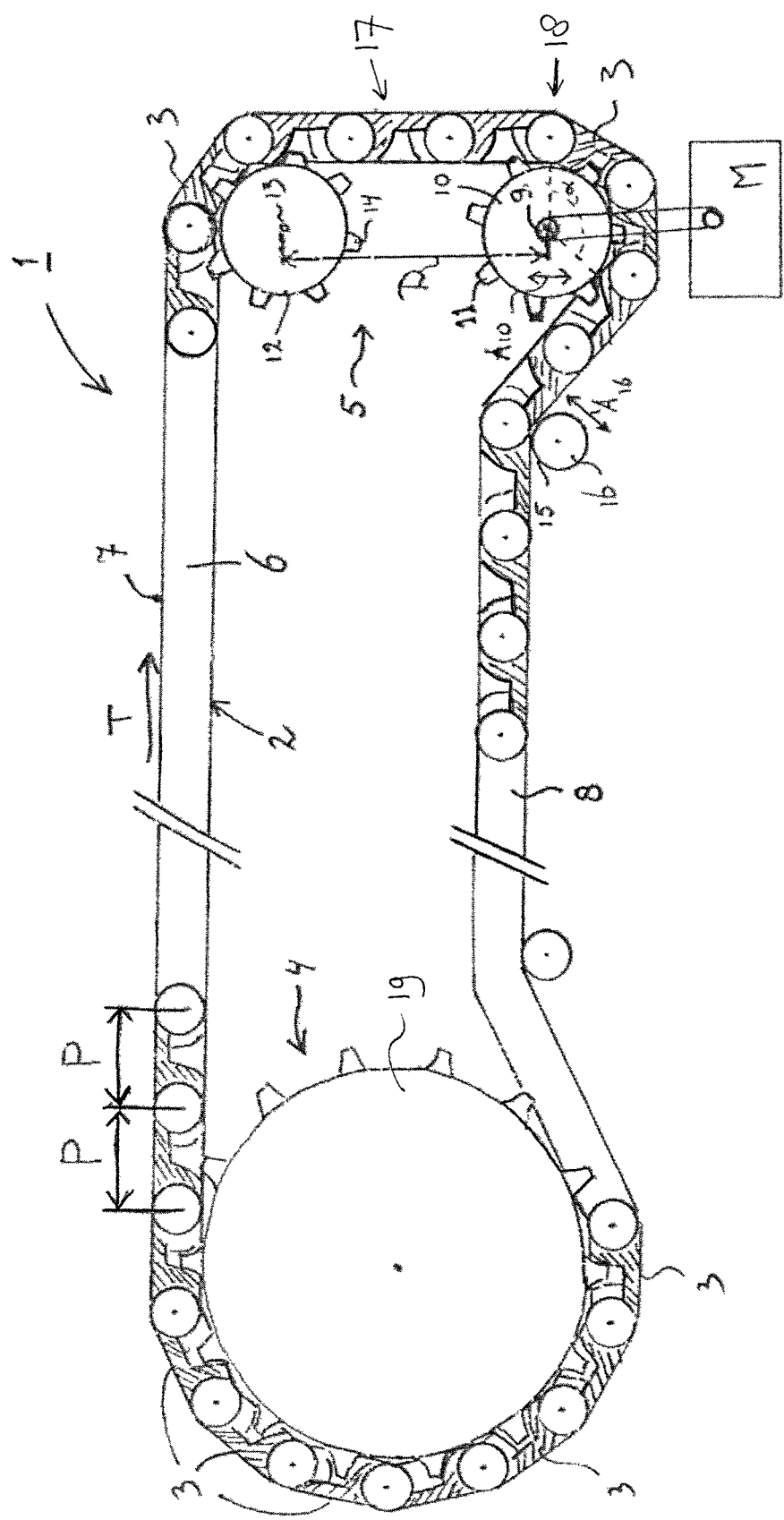
FIG. 2 shows a schematic view in cross section of a second embodiment of a modular conveyor according to the invention.
Figure 3:
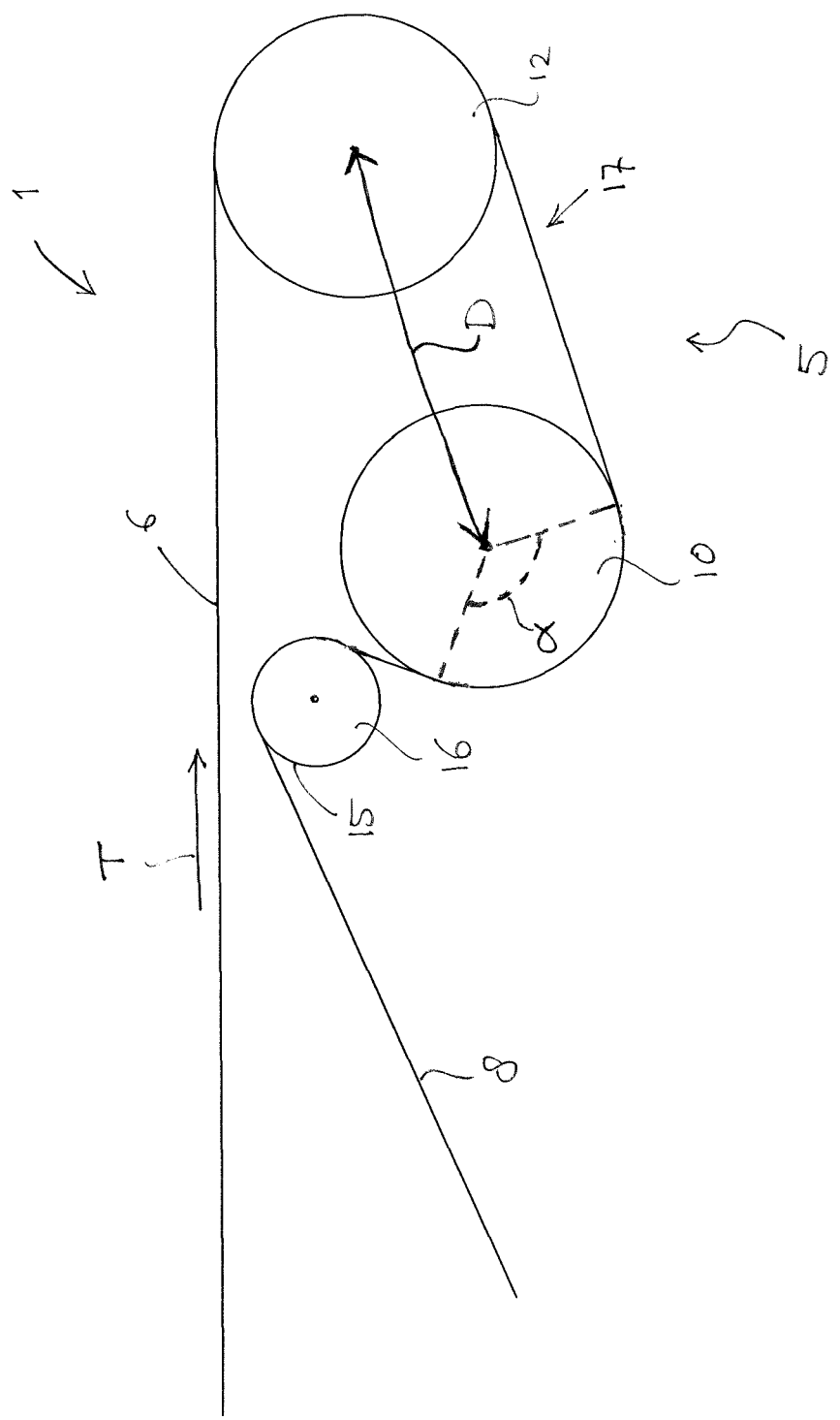
FIG. 3 shows a schematic view in cross section of a third embodiment of a modular conveyor according to the invention.

As can be seen in the embodiments shown in FIGS. 1 and 2, the upper idler wheel 12 may be provided on its periphery with teeth 14 as control surfaces that positively engage corresponding surfaces on the links 3 of the conveyor mat or chain 2. However, it is noted that the upper idler wheel 12 may in alternative embodiments be free of teeth 14 or sprockets, and/or may be free of control surfaces.

A centre line of the upper idler wheel shaft 13 is according to the invention positioned at an intermediate distance D from a centre line of the drive shaft 9, which intermediate distance D equals a distance of (n times P+substantially a ½ time P), in which P is the pitch distance and n is a natural number. In this manner during operation a fluctuation in the linear speed of the upper run 6 of the conveyor mat or chain 2 can be counteracted.

For example, the motor M can drive the drive shaft 9 and the drive wheel 10 to rotate at a substantially constant angular speed. Because the hingedly joined chain links or mat links are substantially rigid, the chain or mat forms a polygon about the drive wheel 10. Thus, the radius of the mat or chain varies periodically around the drive wheel 10, e.g. at a position 18 where the drive wheel engages an at least partly downwardly extending intermediate portion 17 of the mat or chain 2 first engages the drive wheel 10. Since the motor M rotates the drive wheel 10 at a constant angular speed, said varying radius causes the chain or mat links 3 or modules to rise and fall with respect to their line of engagement with the drive wheel 10, i.e. to move radially away from the centre line of the drive wheel shaft 9 and to move radially towards said centre line, respectively. Hence, the linear speed of said intermediate mat or chain portion 17, which extends between the upper idler wheel 12 and the drive wheel 10 in an at least partly downwardly extending direction, fluctuates due to the fact that the mat or chain 2 forms a polygon around the drive wheel 10, which polygon rotates about the centre of said drive wheel 10. The fluctuating linear speed of said mat or chain portion 17 can for instance substantially follow a sine wave-like pattern or so-called sinusoidal pattern. For instance in case the upper idler wheel 12 is provided with sprockets or teeth 14, said intermediate mat or chain portion 17 moving downwards at a fluctuation linear speed will make the upper idler wheel 12 rotate at a correspondingly fluctuating angular speed. This fluctuating angular speed of the upper idler wheel 12 can compensate for the "polygon effect" or so-called "chordal action" caused by the fact that the mat or chain 2 also forms a polygon when running around the upper idler wheel 12. Since the intermediate distance D between the centre line of the drive shaft 9 and the centre line of the upper idler wheel 12 equals a distance of (n times P+substantially a ½ time P), in which P is the pitch distance and n is a natural number, the fluctuation in the linear speed of the conveyor mat or chain 2 due to the chordal action generated by the upper idler wheel 12 is out of phase with the fluctuation in the linear speed of the conveyor mat or chain 2 due to the chordal action generated by the drive wheel 10. This is, the polygon effect of the drive wheel 10 and the upper idler wheel 12 can compensate for each other such that the upper run 6 of the mat or chain 2 can be moved in the transport diction T at substantially constant linear speed. In this manner, during operation, a fluctuation in the linear speed of the upper run 6 of the conveyor mat or chain 2 can thus be counteracted and the upper run can be moved at a substantially constant linear speed.

In case the intermediate distance D is a distance of (n times P+exactly a ½ time P), the polygon effects of the drive wheel 10 and the upper idler wheel 12 can for example be exactly in anti-phase. Nevertheless, if the intermediate distance D is a distance of (n times P+substantially a ½ time P), the two polygon effects can for example still be substantially in anti-phase and the linear speed of the upper run 6 can be substantially constant when the drive wheel 10 is driven at constant angular speed. Although the "substantially a ½ time P" may advantageously approach "exactly a ½ time P" as much as possible, it is noted that "substantially a ½ time P" may in embodiments for instance be in the range of "0.35 time P–0.65 time P", preferably in the range of "0.4 time P–0.6 time P", more preferably in the range of "0.45 time P–0.65 time P" or in the range of "0.48 time P–0.52 time P".

In the shown embodiments, the radius of the upper idler wheel 12 and the radius of the drive wheel 10 are equal to each other. Further, the number of teeth 14 on the upper idler wheel 12 and the number of teeth 11 on the drive wheel 10 are equal to each other in the shown exemplary embodiments. Although the drive wheel 10 can preferably have teeth 14, the upper idler wheel 12 may in embodiments be free of teeth 14.

That the radius of the upper idler wheel and the radius of the drive wheel are substantially equal to each other can be understood as that they are shaped such that a polygon formed about the drive wheel by the conveyor mat or chain and a polygon formed about the upper idler wheel by the conveyor mat or chain both have the same size and/or that angles between respective adjacent modules in a portion of the mat or chain running about the upper idler wheel are the same as the angles between adjacent modules in the mat or chain portion running about the drive wheel.

To be able to adjust the intermediate distance D in order to take account of play within the conveyor mat or chain 2 and possible elongation of the conveyor mat or chain 2 during its operating life so that it is still possible to reduce speed changes in the linear speed of the upper run the upper idler wheel 12 and the drive wheel 10 are mounted displaceable relative to each other in any manner known per se.

As shown in the figures, the modular conveyor 1 comprises a guide surface 15 formed by the periphery of a guide roller 16 (or in an alternative embodiment a guide bar), which guide roller 16 is positioned below the return run 8 and supports the return run 8. The guide surface 15 is positioned such relative to the drive wheel 10 that the series of mat or chain links 3 are in contact with the drive wheel 10 over an angle α which is at least 120°, so that sufficient drive force can be transferred to the conveyor mat or chain 2 for circulating it correctly around the diverting wheel units 4, 5.

In this context it is noted that the first diverting wheel unit 4 may for instance comprise a single idler diverting wheel 19, as for instance is the case in the exemplary embodiment shown in FIG. 1. Nevertheless, the first diverting wheel unit 4 may of any other suitable design. In alternative embodiments, such as for example is the case in the exemplary embodiment shown in FIG. 2, the first diverting wheel unit 4 may for instance comprise multiple idler diverting wheels. For example, the first diverting wheel unit 4 may comprise two idler diverting wheels 20, 21, e.g. an upper idler diverting wheel 20 and a lower idler diverting wheel 21, of which centre lines may in embodiments for instance be space apart over a distance X equaling (n times P+substantially a ½ time P), in which P is the pitch distance and n is a natural number.

Further, it is noted that the modular conveyor 1 can optionally comprise a tensioning means which can advantageously be formed by the drive wheel 10 which is arranged so as to be, at least vertically, displaceable as indicated by arrow $A_{10}$ or the guide roller 16 which is arranged so as to be displaceable, especially at least vertically and/or at least horizontally displaceable, as indicated by arrow $A_{16}$. The tensioning means 10, 16 are or can be brought into contact with the outer surface 7 of the conveyor mat or chain 2 and can be displaced to push the conveyor mat or chain 2 further outward or inward, respectively to increase the tension or can be displaced in the other direction to decrease the tension in the conveyor mat or chain 2. In this manner the optional tensioning means can be used and when necessary adjusted to keep the tension within the conveyor mat or chain 2 at least substantially constant which makes it possible to be able to compensate for the polygon effect of the drive wheel 10 during the operating life of the conveyor mat or chain 2.

It is noted that for the purpose of clarity and a concise description features are described herein as part of the same or separate embodiments, however, it will be appreciated that the scope of the invention may include embodiments having combinations of all or some of the features described.

Further, it is noted that the invention is not restricted to the embodiments described herein. It will be understood that many variants are possible.

Such and other variants will be apparent for the person skilled in the art and are considered to lie within in the scope of the invention as formulated in the following claims.

The invention claimed is:

1. A modular conveyor comprising:
    a conveyor mat or conveyor chain for conveying products in a transport direction, said mat or chain including a series of modules successive in the transport direction, hingedly connected together into an endless loop, wherein said modules, viewed in the transport direction, are each provided at their front and rear side with hinge loops, wherein the hinge loops of modules successive in the transport direction cooperate and are coupled with the aid of hinge pins extending transversely to the transport direction, the hinge loop at the front side of a module being positioned at a pitch distance from the hinge loop at the front side of an adjacent module, the pitch distance at which each hinge loop at the front side of a module is positioned from a hinge loop at the front side of an adjacent module being at least substantially the same throughout the conveyor mat or chain,
    two spaced apart diverting wheel units around which the conveyor mat or chain is to be circulated, the modular mat or chain comprising an upper run with an outer surface forming a transport surface for carrying items in the transport direction and a lower return run, at least one of the diverting wheel units comprising a drive shaft, a drive wheel mounted on the drive shaft and drivingly engaging the conveyor mat or chain, said conveyor mat or chain being diverted around the drive wheel, and a motor coupled to the drive shaft for during operation rotating the drive shaft and the drive wheel,
    wherein the at least one diverting wheel unit further comprises an upper idler wheel mounted on an idler wheel shaft, wherein the radius of the upper idler wheel and the radius of the drive wheel are substantially equal to each other, said upper idler wheel being positioned at a height level above the drive wheel for diverting the conveyor mat or chain from the upper run in an at least partly downward direction towards the drive wheel, and wherein a center line of said upper idler wheel shaft is positioned at an intermediate distance from a center line of the drive shaft, which intermediate distance equals a distance of (n times the pitch distance+substantially a ½ time the pitch distance), in which n is a natural number.

2. The modular conveyor according to claim 1, wherein the upper idler wheel shaft and the drive shaft are mounted displaceable relative to each other for adjusting the intermediate distance between their center lines, to take account of play within the conveyor mat or chain and of possible elongation of the pitch distance of the conveyor mat or chain during the operating life of said mat or chain, by adjusting said intermediate distance.

3. The modular conveyor according to claim 1, wherein the drive wheel is provided on its periphery with control surfaces.

4. The modular conveyor according to claim 3, wherein the upper idler wheel is provided on its periphery with control surfaces and wherein the number of control surfaces on the upper idler wheel and the number of control surfaces on the drive wheel are equal to each other.

5. The modular conveyor according to claim 1, wherein the modular conveyor comprises a guide surface positioned below the return run and supporting the return run, said guide surface being positioned relative to the drive wheel so that the series of modules are in contact with the drive wheel at least over 120° of the drive wheel.

6. The modular conveyor according to claim 1, wherein—during operation—a fluctuation in a linear speed of the conveyor mat or chain due to a chordal action generated by the upper idler wheel is out of phase with a fluctuation in a linear speed of the conveyor mat or chain due to a chordal action generated by the drive wheel.

7. The modular conveyor according to claim 1, wherein the modular conveyor comprises a tensioning mechanism being arranged for contacting the outer surface of the conveyor mat or chain.

8. The modular conveyor according to claim 7, wherein the tensioning mechanism comprises the drive wheel which is arranged to be at least vertically displaceable.

9. The modular conveyor according to claim 7, in which the modular conveyor comprises a guide surface positioned below the return run and supporting the return run, said guide surface being positioned relative to the drive wheel so that the series of modules are in contact with the drive wheel at least over 120° of the drive wheel, wherein the tensioning mechanism comprises the guide surface which is arranged to be displaceable.

10. The modular conveyor according to claim 3, wherein the control surfaces are teeth.

11. The modular conveyor according to claim 5, wherein the guide surface is provided by at least one of a guide roller or guide bar.

12. The modular conveyor according to claim 7, wherein the tensioning mechanism is arranged for contacting the outer surface of the lower run of the conveyor mat or chain.

13. The modular conveyor according to claim 7, wherein said tensioning mechanism is adjustable and/or is biased towards the conveyor mat or chain to facilitate keeping the tension within the conveyor mat or chain at least substantially constant.

14. The modular conveyor according to claim 9, wherein the guide surface is biased towards the conveyor mat or chain.

* * * * *